Aug. 24, 1948.  M. TRESHOW  2,447,605
MILL BEARING CONSTRUCTION
Filed Aug. 24, 1944  2 Sheets-Sheet 1
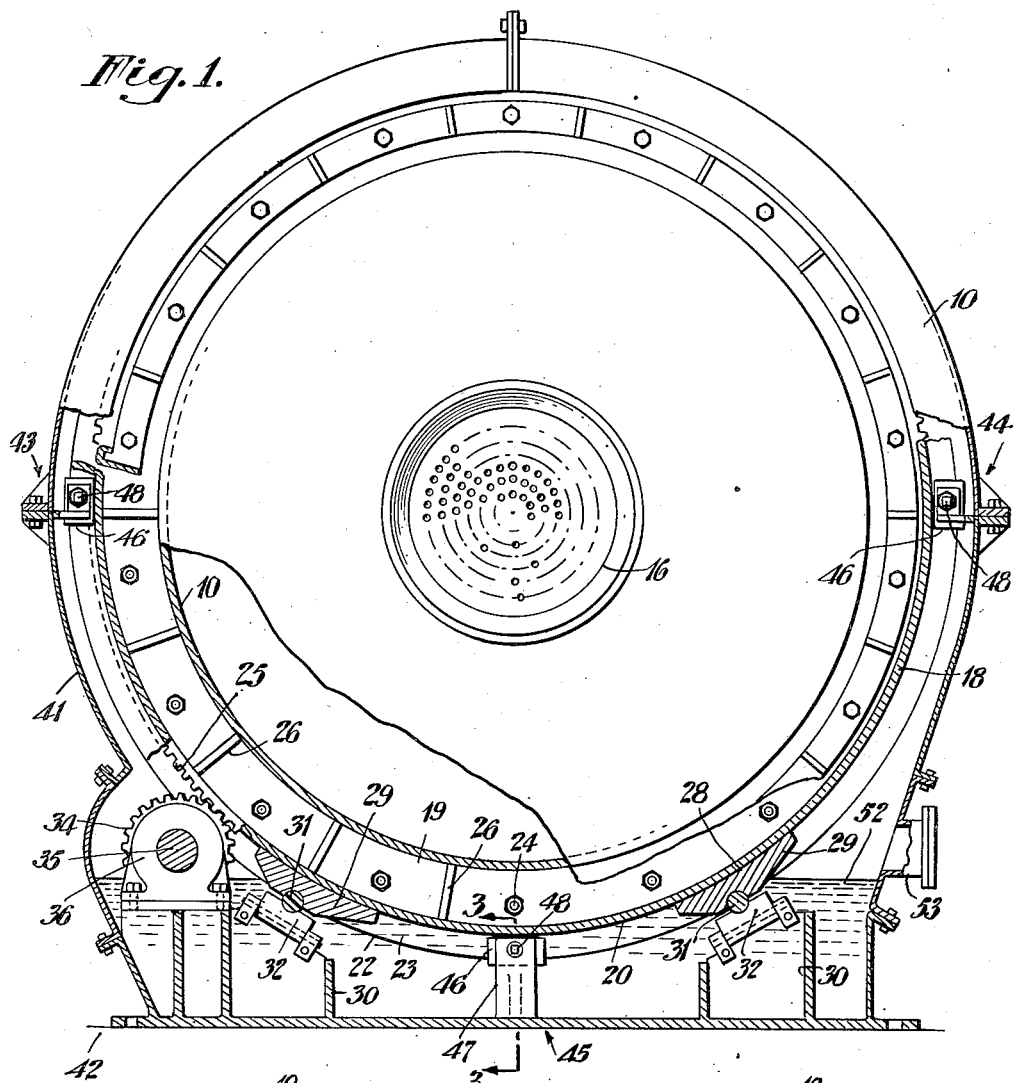
Fig.1.
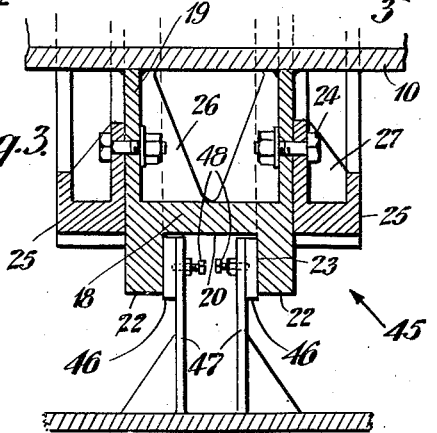
Fig.3.
Fig.4.
INVENTOR.
MICHAEL TRESHOW
BY
ATTORNEYS Aug. 24, 1948.　　　　M. TRESHOW　　　　2,447,605
MILL BEARING CONSTRUCTION
Filed Aug. 24, 1944　　　　　　　　　　　　　2 Sheets-Sheet 2
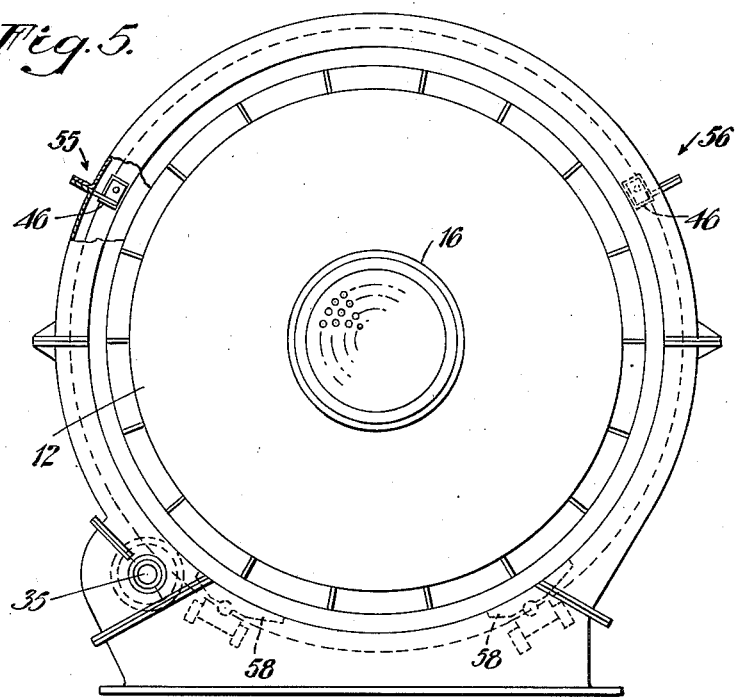
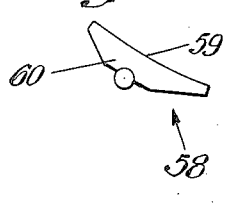
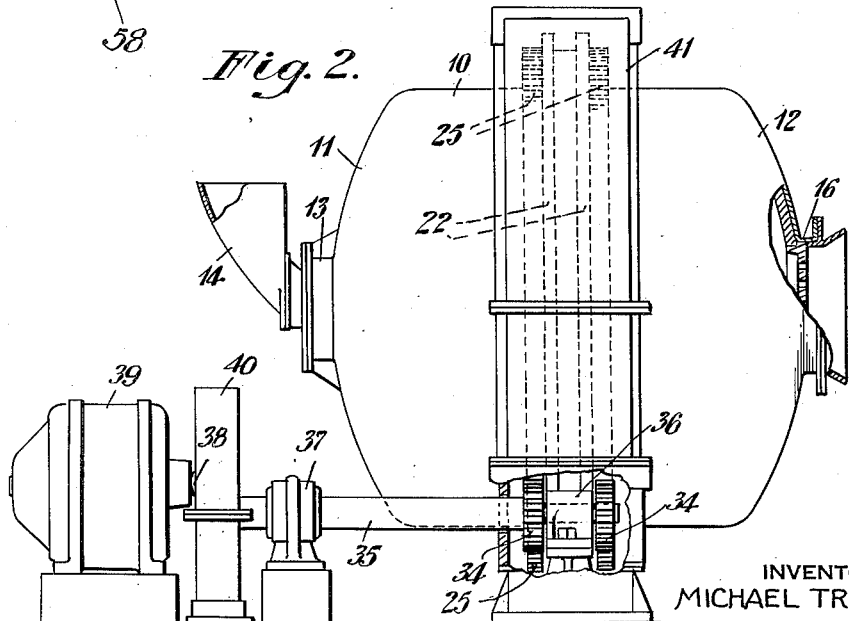
INVENTOR
MICHAEL TRESHOW
BY
ATTORNEYS Patented Aug. 24, 1948

2,447,605

UNITED STATES PATENT OFFICE 2,447,605

MILL BEARING CONSTRUCTION

Michael Treshow, Pacific Palisades, Calif., assignor to F. L. Smidth & Co., New York, N. Y., a corporation of New Jersey Application August 24, 1944, Serial No. 550,928

9 Claims. (Cl. 308—73)

This invention relates to apparatus of the type which comprises a generally cylindrical shell adapted for rotation about its longitudinal axis. Examples of such apparatus include ball mills, rotary kilns, rotary driers, and the like. More particularly, the invention is concerned with an apparatus of this type in which novel means are provided for supporting the shell and preventing its tilting during rotation. Although the new apparatus may take any of the forms mentioned above, the invention may be embodied to especial advantage in ball mills; and its application to ball mill construction will be illustrated and described in detail for purposes of explanation.

Ball mills consist essentially of a generally cylindrical shell or drum mounted with its longitudinal axis horizontal and supported for rotation on that axis. The shell is closed at its ends and is provided with an inlet at one end through which material to be ground may be introduced by appropriate means and with an outlet at the other end through which the ground material is discharged.

In one prior ball mill construction, the shell is provided with trunnion bearings at each end and with a master gear which encircles and is secured to the shell and which is enclosed in a casing. This construction, which requires relatively large trunnion bearings because the entire weight of the shell and its contents is borne by these bearings, is relatively expensive. In another prior form of ball mill, one of the trunnion bearings is eliminated, and the shell is provided near one end with a slide ring encircling and fastened to the shell and mounted on slide shoes, the ring and the shoes being enclosed within a casing. Such construction, although less expensive than the other, nevertheless requires two casings, one for the master gear and one for the slide ring. In a further development of ball mill construction, the slide ring is positioned centrally of the shell so that the slide shoes bear substantially the entire load, and the remaining trunnion bearing may be thereby eliminated and replaced by a small guide bearing that serves solely to prevent the mill from tilting about its main support.

The present invention is directed to the provision of a ball mill or similar apparatus in which the single end guide bearing is eliminated and the mill is supported entirely by an improved slide ring construction that prevents any tilting of the shell. The improved construction also substantially entirely eliminates those difficulties arising from misalignment of the shell and other parts caused by warping or buckling thereof as a result of operating or temperature conditions.

In the new apparatus in the form of a ball mill, for example, the shell is provided with the customary inlet and outlet at its respective ends. Substantially midway between its ends, the shell is encircled by a ring member that is secured thereto and has a periphery provided with adjacent circumferential sections, one of which has a smooth surface and another of which is formed as a gear. The shell is rotated by means of a pinion which meshes with the gear section of the ring member, and it rests upon supporting means which engage the smooth section of the ring member. The smooth section is provided along its edges with radially extending flanges that are engaged by means serving to prevent tilting of the shell during its rotation. These means are positioned at spaced intervals about the periphery of the ring member and remote from the supporting means. Two such means may be employed at diametrically opposite ends of the horizontal transverse axis of the shell, and one at the lower end of the vertical transverse axis thereof. If desired, only two means for preventing tilting may be employed, and they may then be disposed at opposite sides of the shell above its horizontal transverse axis. In such a construction, the supporting means is altered in design so as to engage the radially extending flanges of the ring member. The ring member is enclosed in a casing, the bottom of which is filled with a pool of oil into which the lowermost portion of such member dips for purposes of lubrication. Advantageously, the ring member is provided with a pair of gear sections, in which case the smooth portion is formed between them.

The invention will be described in detail in connection with the accompanying drawings, in which:

Fig. 1 is an end view, with parts in section, of a ball mill constructed in accordance with the invention;

Fig. 2 is an elevation, with parts in section, of the mill shown in Fig. 1;

Fig. 3 is a sectional view, on the line 3—3 of Fig. 1, of parts of the apparatus;

Fig. 4 is an enlarged sectional view of a portion of the construction shown in Fig. 3;

Fig. 5 is an end view, with parts in section, of a modified construction; and

Fig. 6 is a detail view of one of the supporting means in the modified construction.

The ball mill shown in Figs. 1 and 2 includes a generally cylindrical shell 10 having end sections 11 and 12. Section 11 is provided with an inlet 13 for material supplied thereto by spout 14, and section 12 is provided with an outlet 16 for discharge of material therefrom into any appropriate receptacle. The shell construction thus described is conventional.

Encircling the shell substantially midway between its ends is a ring 18 which is provided with inwardly extending webs 19 that may be welded or otherwise secured to the outer surface of shell 10. Ring 18 has a smooth peripheral surface 20 and is provided along its edges with outwardly extending radial flanges 22 having smooth inner surfaces 23 and forming an outwardly opening circumferential channel on ring 18. Attached to each web 19 of ring 18, as by means of bolts 24, is a gear ring or section 25, the root diameter of which is the same as that of the ring 18 in the construction shown. It will be understood, however, that the diameter of the gear rings may be greater or less than that of the smooth ring as is desired. Transverse webs 26 are provided to reinforce ring 18, and webs 27 serve to strengthen the gear rings 25.

The smooth surface 20 of ring 18 may serve as a tire running on supporting rollers or as a slide ring sliding over appropriate supporting slide shoes. In the latter construction, which is shown in the drawings, the smooth surface of ring 18 engages and slides on the bearing surfaces 28 of slide shoes 29 supported on standards 30. Each slide shoe is preferably adapted for universal movement; and, for this purpose, there is provided a ball or pivot 31 that fits into a recess on the under surface of shoe 29 and rests in another recess in the mounting 32 pivotally secured to the standard 30.

The shell is rotated by means of a pair of pinions 34 mounted on a shaft 35, which is supported in bearing 36 between the pinions and bearing 37 and is connected to the shaft 38 of the driving motor 39 through a gear reduction box 40. If desired, any other suitable arrangement for driving shaft 35 may be employed. In the construction shown in Fig. 2, the gear rings 25 and the pinions 34 have teeth of the spur type; but any other suitable gear teeth such as those of the herringbone type may be used for the purpose.

Ring 18 with its gear rings 25, driving pinions 34, and slide shoes 29 together with the associated supports are all enclosed within a casing 41 which encircles shell 10. This casing prevents access of dust and other deleterious material to the parts and is provided with the necessary sealing means along its edges in contact with shell 10 and around the periphery of the opening in the side wall thereof through which shaft 35 passes. Casing 41 rests on foundation 42 and may conveniently be constructed in sections that may be bolted together, for example, as shown in Fig. 1, for removal of one or more sections to provide ready access to the driving and supporting elements enclosed thereby.

In order to prevent tilting of the mill about its centrally located support, a plurality of means, generally indicated at 43, 44, and 45, is mounted to engage the smooth surfaces 23 of the radially extending flanges 22 at points spaced about the periphery of ring 18 and remote from the slide shoes 29. As shown in Figs. 3 and 4, each of these means comprises a slide shoe 46, a support 47, and a screw 48 threaded through the support and entering a socket 49 in the shoe, the screw being held in adjusted position by a lock nut 50. With this mounting of the shoe, it may adjust its position so that its bearing surface 51 will make full contact with flange 22. Each means 43, 44, 45 includes a pair of slide shoes 46 engaging opposed faces of flanges 22, and each shoe is mounted on a support as described.

Three means for preventing tilting of the shell are generally sufficient, but more than three may be installed if desired. Where three such means are used, they are disposed as indicated in Fig. 1, two at diametrically opposite ends of the horizontal transverse axis of the mill and one at the lower end of the vertical transverse axis of the mill, all three being advantageously located at some distance from slide shoes 29. Since the slide shoes 46 do not carry any load and serve only to counteract the tilting force caused by the rotation of the mill about its central support, they may be made relatively small.

The supports 47 for slide shoes 46 of the means 43, 44 are welded or otherwise securely fastened to the wall of casing 41, and the supports 47 of means 45 may be similarly secured to the base of the casing. The casing is made sufficiently rigid so that it can fully absorb the thrusts arising when the mill load develops the tilting effect. The bottom of the casing is filled with a pool of oil or other lubricant 52, which may be introduced into it through an inlet 53, to a height sufficient to cover at least the lowermost portion of slide ring 18 so that the bearing surfaces 20 and 23 can pick up oil to lubricate the coacting bearing surfaces 28 and 50 on slide shoes 29 and 46, respectively.

Under certain conditions, only two means for preventing tilting may be necessary, and such a construction is shown in Fig. 5. The two means, generally indicated at 55 and 56, are advantageously disposed above the horizontal transverse axis of the mill and on opposite sides thereof. In order to provide ample protection against tilting in such a construction, the slide shoes 58 are formed to coact not only with surface 20 of ring 18 but also with the surfaces 23 of the ring flanges 22. As shown in Fig. 6, slide shoe 58 is provided with the bearing surface 59 to engage surface 20 of ring 18 and with the two parallel bearing surfaces 60 to engage the flange surfaces 23. The resulting combination of the means 55 and 56 and the slide shoes 58 effectively counteracts any tendency of shell 10 to tilt during rotation thereof.

In the construction shown in Figs. 1 and 2, slide ring 18 and gear rings 25 are each illustrated as made in one piece, but if desired, each ring may also be made in sections which may then be bolted or otherwise secured together. Furthermore, slide ring 18 and gear rings 25 may be formed integrally as a single unit instead of being built up as shown.

The means described for preventing tilting of the shell eliminates the necessity of using relatively heavy trunnion bearings or a relatively light guide bearing at one end of the shell and effectively counteracts the tendency of the mill to tilt in operation. The construction described is simpler and less costly than that of previous ball mills and similar apparatus and combines the means for rotating and supporting the shell into a single compact unit, which substantially prevents any misalignment of the mill resulting from warping or buckling of the component parts thereof under operating conditions.

I claim:

1. Apparatus of the type described, which comprises a generally cylindrical shell, a ring member encircling and secured to the shell between the ends thereof and having a smooth peripheral surface, said ring member being provided with radially extending circumferential flanges having opposed smooth surfaces, means beneath the shell engaging the peripheral surface of the ring member to provide the sole support for the shell, separate means remote from the supporting means and engaging the flange surfaces to prevent tilting of the shell, and a casing encircling the shell and enclosing the ring member and both said means, the means for preventing tilting of the shell being attached at least in part to the casing.

2. Apparatus of the type described, which comprises a generally cylindrical shell, a ring member encircling and secured to the shell between the ends thereof and having a smooth peripheral surface, said ring member being provided with a pair of radially extending circumferential flanges projecting outwardly beyond said peripheral surface and having smooth opposed surfaces, means beneath the shell engaging the peripheral surface of the ring member to provide the sole support for the shell, slide shoes remote from the supporting means and engaging the flange surfaces to prevent tilting of the shell, and a casing encircling the shell and enclosing the ring member, the supporting means, and the slide shoes, at least part of the slide shoes being attached to the casing.

3. Apparatus of the type described, which comprises a generally cylindrical shell, a ring member encircling and secured to the shell between the ends thereof and having a smooth peripheral surface, said ring member being provided with a pair of radially outwardly extending circumferential flanges projecting outwardly beyond said peripheral surface and having smooth opposed surfaces, slide shoes mounted beneath the shell and engaging the peripheral surface of the ring member to support the shell, said slide shoes providing the sole support for the shell, a plurality of slide shoes remote from the supporting slide shoes and engaging the flange surfaces to prevent tilting of the shell, and a casing encircling the shell and enclosing the ring member and the two kinds of slide shoes, at least part of the slide shoes preventing tilting of the shell being attached to the casing.

4. Apparatus of the type described, which comprises a generally cylindrical shell mounted substantially horizontally on its longitudinal axis, a ring member encircling and secured to the shell between the ends thereof and having a smooth peripheral surface, said ring member being provided with a pair of radial circumferential flanges extending outwardly beyond said peripheral surface and having smooth opposed surfaces, horizontal slide shoes mounted beneath the shell and engaging the peripheral surface of the ring member to provide the sole support for the shell, three pairs of vertical slide shoes remote from the supporting slide shoes and engaging the flange surfaces to prevent tilting of the shell, two pairs of the vertical slide shoes being disposed at diametrically opposite ends of the horizontal transverse axis of the shell and one pair being disposed at the lower end of the vertical transverse axis of the shell, and a casing encircling the shell and enclosing the ring member and the horizontal and vertical slide shoes, the first two pairs of vertical slide shoes referred to being carried by the casing.

5. Apparatus of the type described, which comprises a generally cylindrical shell mounted substantially horizontally on its longitudinal axis, a ring member encircling and secured to the shell between the ends thereof and having a smooth peripheral surface, said ring member being provided with a pair of radial circumferential flanges extending outwardly beyond said peripheral surface and having smooth opposed surfaces, horizontal slide shoes mounted beneath the shell and engaging the peripheral surface of the ring member to provide the sole support for the shell, two pairs of vertical slide shoes remote from the supporting slide shoes and engaging the flange surfaces to prevent tilting of the shell, the pairs of vertical slide shoes being positioned on opposite sides of the shell above its horizontal transverse axis, the horizontal slide shoes also being adapted to engage the flange surfaces, and a casing encircling the shell and enclosing the ring member and all the slide shoes, the vertical slide shoes being carried by the casing.

6. Apparatus of the type described, which comprises a generally cylindrical shell, a ring member encircling and secured to the shell between the ends thereof and having a smooth peripheral surface, said ring member being provided with a pair of radial circumferential flanges extending outwardly beyond the peripheral surface and having smooth opposed surfaces, means beneath the shell engaging the peripheral surface of the ring member to provide the sole support for the shell, a plurality of slide shoes remote from the supporting means and engaging the flange surfaces to prevent tilting of the shell, and a casing encircling the shell and enclosing the ring member, the supporting means, and the slide shoes, the slide shoes being mounted on the casing.

7. Apparatus of the type described, which comprises a generally cylindrical shell, a ring member encircling and secured to the shell between the ends thereof and having a smooth peripheral surface, said ring member being provided with a pair of radial circumferential flanges extending outwardly beyond the peripheral surface and having smooth opposed surfaces, means beneath the shell engaging the peripheral surface of the ring member to provide the sole support for the shell, a plurality of slide shoes remote from the supporting means and engaging the flange surfaces to prevent tilting of the shell, and a casing encircling the shell and enclosing the supporting means and the slide shoes, the slide shoes being carried by the casing and the casing containing a body of lubricant of a depth sufficient to cover the lowermost portion of the ring member.

8. Apparatus of the type described, which comprises a generally cylindrical shell, a ring member encircling and secured to the shell between the ends thereof and having a smooth peripheral surface, said ring member being provided with a pair of radially extending circumferential flanges projecting outwardly beyond the peripheral surface and having smooth opposed surfaces, means beneath the shell and engaging the peripheral surface of the ring member to provide the sole support for the shell, slide shoes remote from the supporting means and engaging the flange surfaces to prevent tilting of the shell, means for adjusting the slide shoes, and a casing encircling the shell and enclosing the ring member, the supporting means, and the slide shoes, the slide shoes being mounted on the casing.

9. Apparatus of the type described, which comprises a generally cylindrical shell, a ring member encircling and secured to the shell between the ends thereof and having a smooth peripheral surface, said ring member being provided with a pair of radial circumferential flanges projecting outwardly beyond the peripheral surface and having smooth opposed surfaces, slide shoes mounted beneath the shell and engaging the peripheral surface of the ring member to provide the sole support for the shell, the mounting of the shoes permitting self-adjustment thereof, a plurality of slide shoes remote from the supporting slide shoes and engaging the flange surfaces to prevent tilting of the shell, means for adjusting the slide shoes which prevent tilting, and a casing encircling the shell and enclosing the ring member and all the slide shoes, the shoes preventing tilting of the shell being mounted on the casing.

MICHAEL TRESHOW.

REFERENCES CITED

The following references are of record in the file of this patent:

UNITED STATES PATENTS

| Number | Name | Date |
|---|---|---|
| 850,399 | Reiss | Apr. 16, 1907 |
| 2,224,652 | Kingsbury | Dec. 10, 1940 |
| 2,314,595 | Patterson | Mar. 23, 1943 |
| 2,363,260 | Peskin | Nov. 21, 1944 |

FOREIGN PATENTS

| Number | Country | Date |
|---|---|---|
| 308,345 | Germany | Oct. 11, 1918 |